E. N. Smith. Sheet 1. 5 Sheets.

Paper Folding Mach.

No. 186. Reissued Jan. 7. 1851.

E. N. Smith. Sheet 2. 5 Sheets.

Paper Folding Mach.

No. 186. Reissued Jan. 7. 1851.

E. N. Smith. Sheet 3. 5 Sheets.

Paper Folding Mach. Reissued Jan. 7. 1851.

No. 186

E. N. Smith. Sheet 4. 5 Sheets.
Paper Folding Mach.
No. 186. Reissued Jan. 7. 1851.
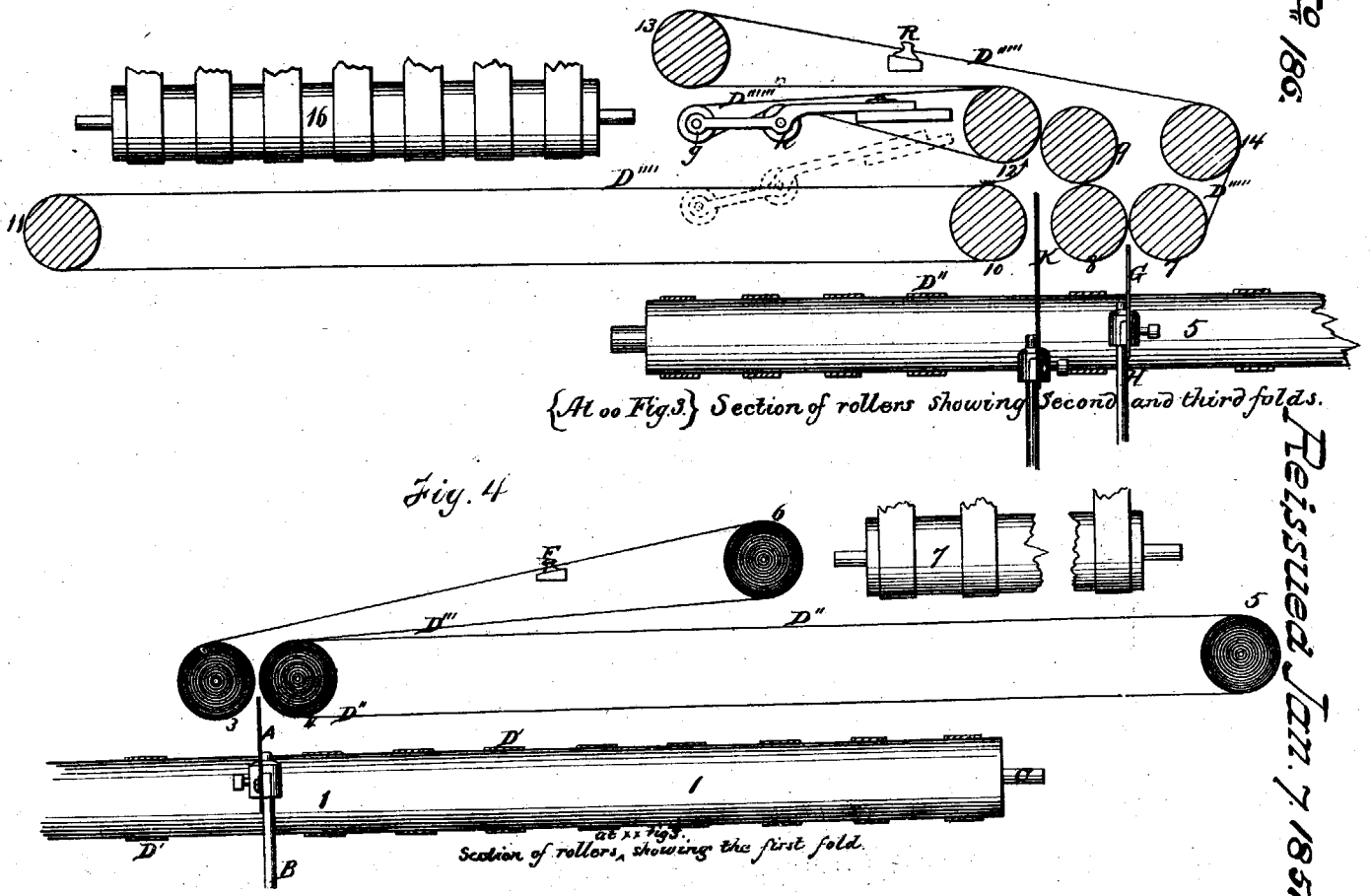

E. N. Smith. Sheet 5. 5 Sheets.

Paper Folding Mach.

No. 186

Reissued Jan. 7, 1851.

UNITED STATES PATENT OFFICE.

EDWARD N. SMITH, OF WEST BROOKFIELD, MASSACHUSETTS, ASSIGNOR TO AMERICAN PAPER FOLDING COMPANY.

IMPROVEMENT IN PAPER-FOLDING MACHINES.

Specification forming part of Letters Patent No. 6,896, dated November 27, 1849; Reissue No. 186, dated January 7, 1851.

*To all whom it may concern:*

Be it known that I, EDWARD N. SMITH, of West Brookfield, in the county of Worcester and State of Massachusetts, have invented a new and useful Method of Folding Sheets of Paper, of which the following is a full, clear, and exact description, reference being had to the accompanying drawings, which form part of this specification, and in which—

Figure 1:
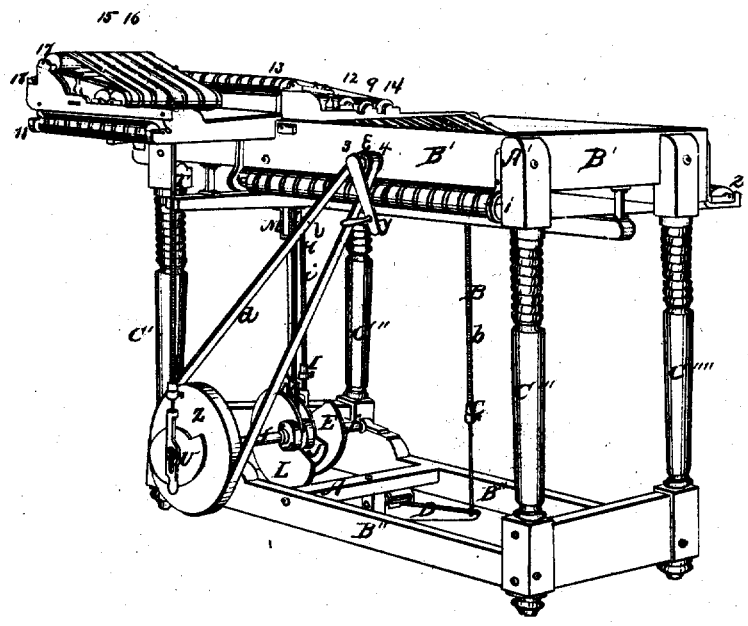
Figure 2:
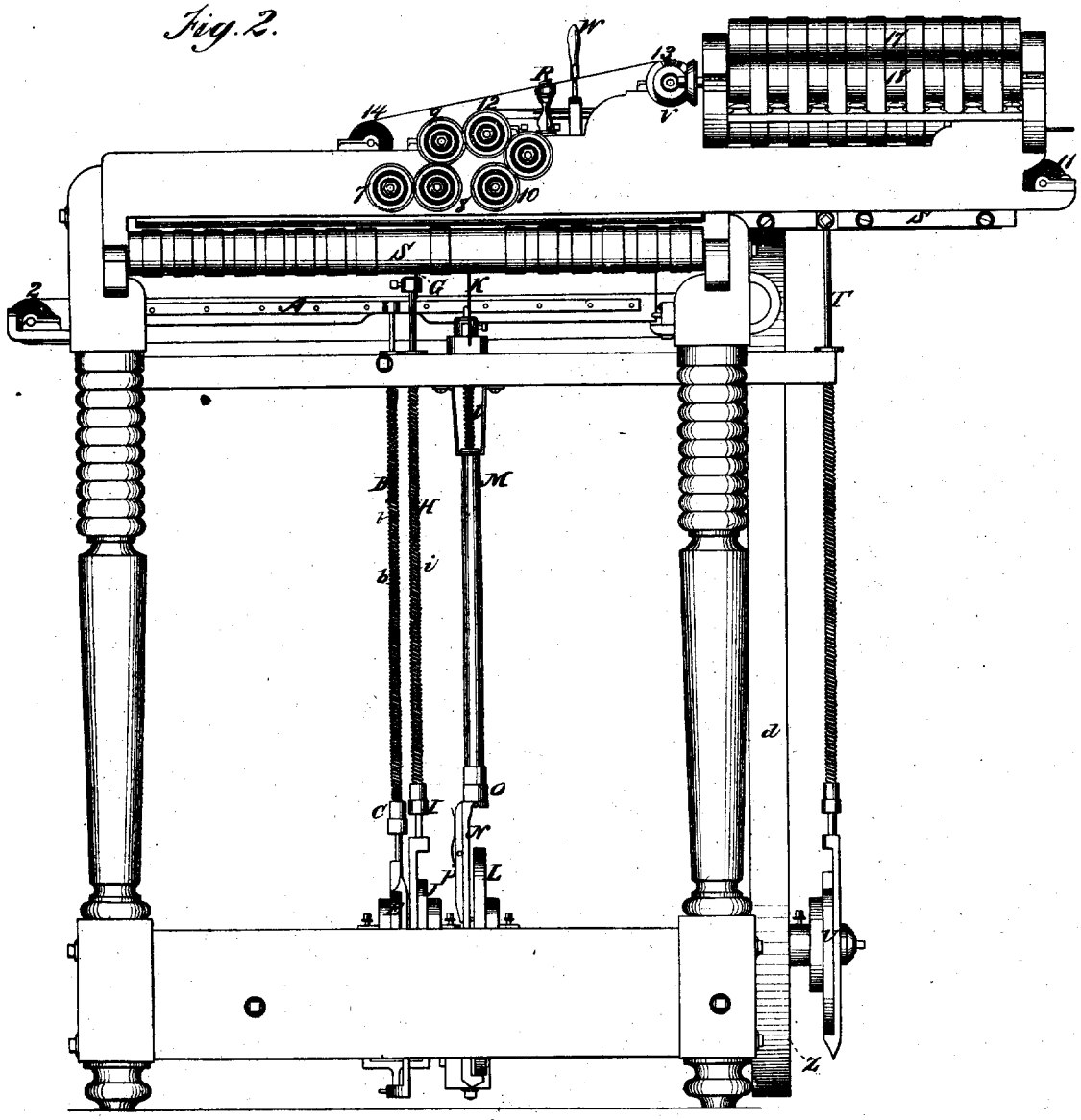
Figure 3:
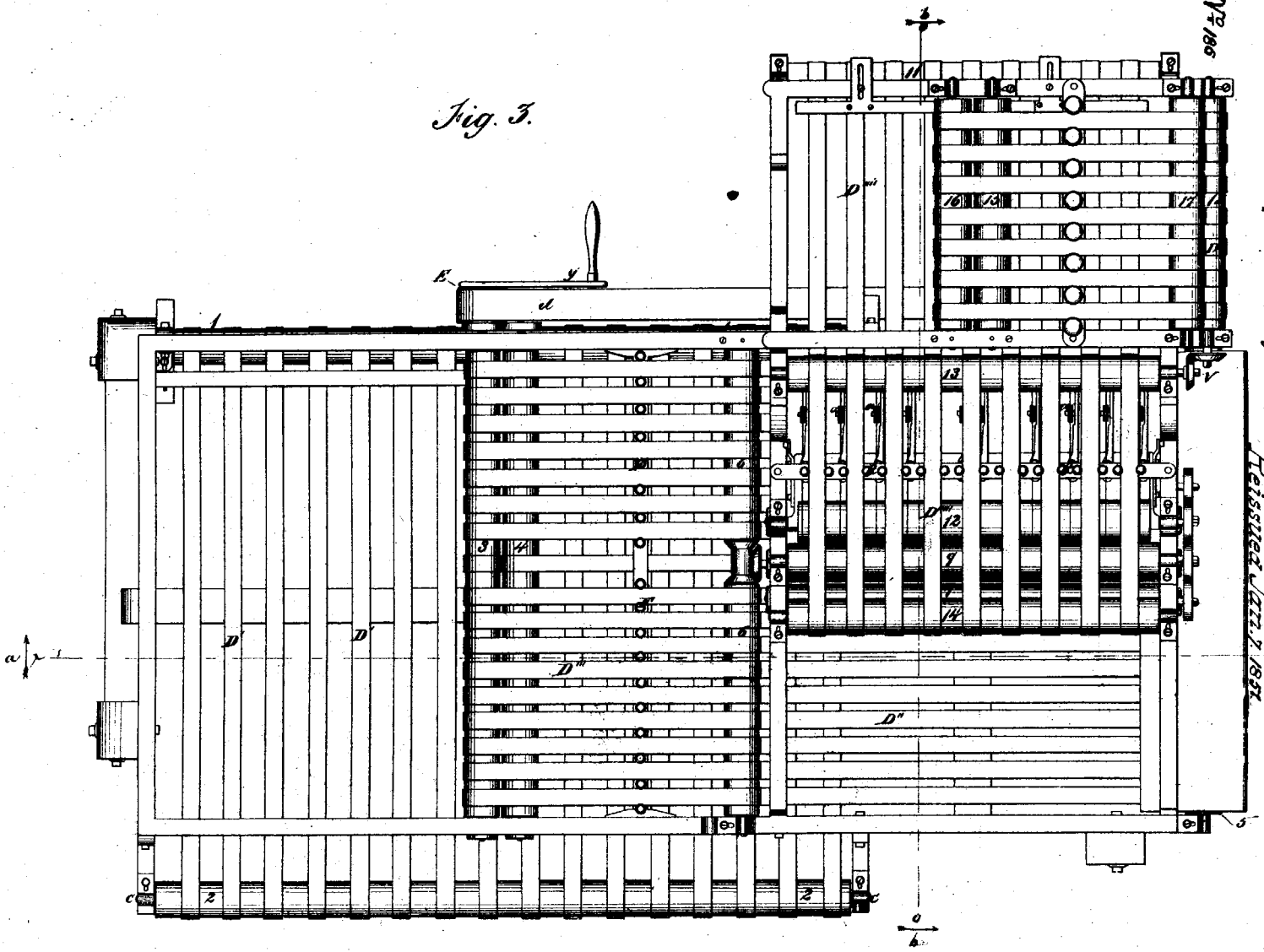
Figure 6:
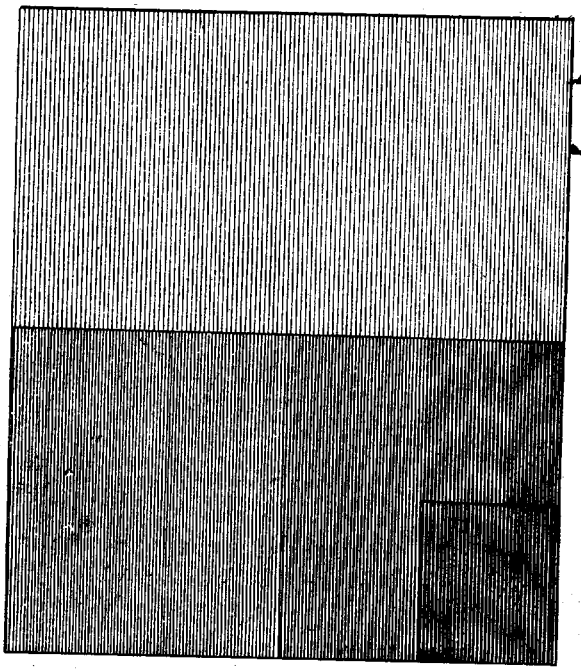
Figure 7:
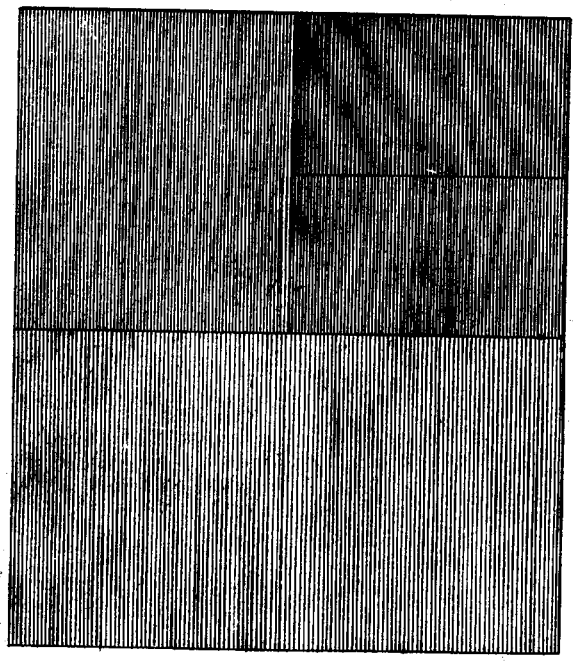

Figure 1 is a view in perspective of my automatic paper-folder. Fig. 2 is an elevation of the end of the machine at which the folded paper is discharged. Fig. 3 is a plan showing the arrangement of the endless bands and rollers. Fig. 4 is a vertical section of the line *x x* of Fig. 3, looking in the direction indicated by the arrows *a a*. Fig. 5 is a vertical section at the line *o o*, Fig. 3, looking in the direction indicated by the arrows *b b;* and Figs. 6 and 7 are plans of sheets of paper, showing the various foldings.

It has hitherto been customary to fold sheets of paper, after leaving the printing-press, by hand. This process, even under the old and slow system of printing, is not only excessively tedious, but requires the employment of a number of persons, who, with their work-tables, occupy a considerable space. The inconveniences resulting are great in any case, but are especially so when, as is the case with daily newspapers, the sheets must be folded as fast as they are printed. Under the new system of printing, in which an immense number of copies are thrown off by a single press, the difficulties are greatly enhanced and present a serious obstacle to the increase of the speed of printing.

The exigencies of business have long required a mechanical substitute for hand-folding, and to supply this desideratum is the main object of my invention, the first and leading part of which consists in forming folds in sheets of paper by means of a straight-edge, or any equivalent therefor, which strikes the sheet in the line and at the place at which the fold is to be formed, when this acts by machinery in connection with a space, slot, or recess between two edges or surfaces, thus causing the fold to be made over the straight-edge, or any equivalent therefor.

The second part of my invention, which is secondary to and dependent on the first and leading part of my invention, consists in completing the folds in sheets of paper by making the surfaces between which the straight-edge passes converging and movable to press the fold; and the last part of my invention consists in combining two series of belts or cords, passing around rollers for each straight-edge, for extending and moving the sheets of paper and presenting them in turn to be folded.

To exemplify one of the modes in which my invention can be reduced to practice, I will proceed to describe the construction and operation of a machine which I have made for folding sheets of paper a number of times consecutively, and which is represented in the accompanying drawings.

This machine consists of a strong frame supporting a number of revolving rollers, some of which are arranged in pairs, with a long narrow space or slot between the rollers of each pair, into which the extended sheet of paper is struck by a straight-edge to make the fold. The paper, after being folded by passing through the space, is carried to the next space to receive another fold, upon an endless moving apron composed of parallel belts encircling one of the rollers which form the sides of the space, and a corresponding tightening-roller parallel thereto and placed beyond the next opening into which the paper is to be struck. There is in most cases a second shorter moving apron which encircles the other roller of the pair between which the fold is struck, and a corresponding tightening-roller placed a little above the carrying-apron, at a short distance from the space. This shorter apron in passing from the roller at the space to its tightening-roller is deflected by the roller on the opposite side of the space, and therefore presses upon the carrying-apron. The adjacent surfaces of the two aprons are moved in the same direction, and as they converge seize the fold of paper struck up between them by the straight-edge and compress and carry it forward. These moving aprons, with their rollers and the straight-edges, are operated by suitable machinery, which is mounted with them on the frame.

The frame of the machine, which is of a rectangular form, is composed of upright posts $c'$ $c''$ $c'''$ $c''''$, connected by upper and lower horizontal side and end rails, B′ B′ and B″ B″. To the sides of the frame are attached the bearings in which the journals $c$ of the rollers 1 and 2 are supported. These rollers are parallel, their peripheries move with equal velocities, and the two are surrounded by a set of parallel endless bands. The tops of these bands constitute a plane surface, D′, on which the extended sheet of paper to be folded is received. Between the central bands of this surface, and parallel in direction with them, is a straight-edge, A, supported by a vertical rod or stem, B, to which a vertical reciprocating motion is given by a cam, E, and by a helical spring, $b$, coiled upon the vertical stem, the cam E being secured to a horizontal shaft, $f$, turning in bearings attached to the lower side rails, B″, of the frame. The cam acts to depress the straight-edge A below the moving surface D′, Fig. 4, on which the paper is extended, and at the same time strains the spring $b$. As the shaft revolves, the rod is liberated, and the spring $b$, contracting again, throws the straight-edge suddenly upward. The edge, striking the paper across its middle, forces it upward into a space or slot between the adjoining surfaces of two sets of endless bands, D″ D‴, respectively moving on two rollers, 3 4, which are parallel with each other and revolve at right angles to the moving surface D′, on which the paper was entered. These endless bands are of unequal length. The longer, D″, passes off horizontally and returns round a tightening-roller, 5, parallel with the first two rollers 3 and 4. It forms the second movable plane surface on which the paper is extended, and from which it can be struck upward by a second straight-edge, G, into a second opening, to be seized in turn by a second set of bands. The shorter endless band, D‴, after pressing against the first, D″, sufficiently long to seize the paper and draw it upon the second moving surface, diverges from it and returns over a roller, 6, revolving above the longer band. By multiplying the sets of endless bands and straight-edges any required number of folds may be made at right angles to each other; or by varying the angle of the bands and folding-edges any desired angle may be given to the folds with respect to each other.

It is frequently necessary that the lines at which successive folds are made shall be parallel. To accomplish this result, the arrangement of the bands and straight-edges is varied, as shown in Fig. 5. The longer folding-band, D⁗, does not run directly upon one, 8, of the two rollers 7 8, forming the space between which the straight-edge G strikes the sheet, but upon a third roller, 10, which has its axis in the same plane and parallel with those of the first two, and is separated by a narrow space from them. Through this space a second straight-edge, K, is projected upward against the paper struck up by the first straight-edge, G, and, passing over the space to the horizontal band D⁗, this second straight-edge forces the paper upward into a space between two bands, D′′′′′ D′′′′′, which run on a pair of parallel rolls, 912, revolving directly above the space between the two lower rolls, 8 10, through which this second straight-edge, K, is projected. One of these bands, D′′′′′, is the short one, which has already acted in making the first fold, and which is bent out of its direct course to the tightening-roll 13 by this second pair of folding-rolls. The other band, D′′′′′′, is tightened by passing its several members over a set of small rolls, $g$, all having the same common axis. This set of tighteners can be moved up or down in a circular arc of which the axis of the folding-roll 12 is the center. When the double parallel folding is required, the second folding-edge, K, is put in gear, and the tighteners $g$ of this short endless band are depressed to deliver the folded paper upon the horizontal band D⁗. When this parallel folding is not required the second folding-edge K is thrown out of gear, the tighteners are raised, and the sheet folded by the first folding-edge, G, passes directly to the horizontal band D⁗, from which it is struck in a line at right angles to the first fold.

The machine represented in the drawings is arranged to fold paper four times, in the manner shown in Fig. 7, the first fold being across the paper, the second being at right angles to the first, the third parallel to the second, and the fourth at right angles to the third fold. The first fold is made by striking the paper into a space between the rolls 3 and 4 by means of the straight-edge A, which is operated by the spring $b$ and cam E acting upon a stem, B, to the upper extremity of which the straight-edge is secured. The paper is seized in the space by bands D″ D‴, running on the rollers 3 and 4, and is extended upon the band D″. From this it is struck upward into a second space by the straight-edge G, operated by a cam, J, and spring $i$, acting upon its stem H, to be seized by the roller 8 and the band running on the roller 7. K is the third straight-edge with its stem M, cam L, and spring $i$. 9 and 12 are the third folding-rolls. The horizontal band D⁗ receives the paper after the third fold is made, and conveys it to be acted upon by a fourth straight-edge, S, from which it is seized by the folding-rolls 15 and 16 and delivered upon the band D′, by which it is discharged from the machine. The power of the prime mover is applied directly to the shaft of the roller 3, and thence by belts and cog-wheels to the several members of the machine. The folder thus constructed may be applied directly to the roller printing-press, and receive the sheets as fast as they are printed. The paper may be delivered by the machine after any number of folds have been made by throwing the remaining folding-edges out of gear, or any fold may be omitted, as in Fig. 6, where the third fold of Fig. 7 has not been made. The folding-edges may be thrown out of or into gear with their respective cams by the arrangement represented at M N O P, Fig. 2, or in any other convenient manner.

I have described the straight-edges as projected upward by springs and held down by cams; but cams may be used to project the folding-edges and springs to hold them down, or other equivalent mechanical devices may be substituted for the cams and springs. It is also obvious that a piece of cord or a wire will answer instead of a straight edge, and even a curved edge may be used for the same purpose.

I wish it to be understood that I do not limit myself to the use of all the parts of my invention in connection, as the first may be used independently of the second and third for simply striking or forming the fold, and the first and second may be used independently of the third for making and completing a single fold, and for any number of folds by substituting some other method of conveying the sheets.

Having thus pointed out the principles or characteristic features which distinguish my invention from all other things heretofore known, and fully described the mode of application of those principles which I have essayed with success, what I claim as my invention, and desire to secure by Letters Patent, is—

1. The method of folding sheets of paper mechanically by means of a reciprocating straight-edge, or its equivalent, which strikes the sheet where the fold is to be made and forces it into a recess or space between two surfaces, through which it can be delivered, in combination with a mechanism which presents the sheet at the proper place and time to make the fold or folds at the proper line or lines, substantially as described.

2. The method of completing the folds in sheets of paper by passing them between converging surfaces, in combination with the method of forming the folds, substantially as described.

3. The moving surfaces of endless belts or their equivalents on which the sheets of paper are extended, and by which they are moved, in combination with the method of making and completing the folds, substantially in the manner specified.

EDWARD N. SMITH.

In the presence of—
THOMAS A. DEXTER,
RALPH PLYMPTON.